United States Patent
He et al.

(10) Patent No.: US 12,267,823 B2
(45) Date of Patent: Apr. 1, 2025

(54) ENHANCED INITIAL ACCESS WITH MULTI-BEAM OPERATIONS

(71) Applicant: QUALCOMM Incorporated, San Diego, CA (US)

(72) Inventors: Linhai He, San Diego, CA (US); Gavin Bernard Horn, La Jolla, CA (US); Miguel Griot, La Jolla, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/398,473

(22) Filed: Dec. 28, 2023

(65) Prior Publication Data

US 2024/0129911 A1 Apr. 18, 2024

Related U.S. Application Data

(62) Division of application No. 17/305,199, filed on Jul. 1, 2021, now Pat. No. 11,910,372.

(Continued)

(51) Int. Cl.
| | |
|---|---|
| H04W 72/04 | (2023.01) |
| H04W 56/00 | (2009.01) |
| H04W 72/044 | (2023.01) |
| H04W 72/30 | (2023.01) |
| H04W 74/0833 | (2024.01) |

(52) U.S. Cl.
CPC ....... *H04W 72/046* (2013.01); *H04W 56/001* (2013.01); *H04W 72/30* (2023.01); *H04W 74/0833* (2013.01)

(58) Field of Classification Search
CPC ............ H04W 74/0833; H04W 56/001; H04B 7/06952
See application file for complete search history.

(56) References Cited

U.S. PATENT DOCUMENTS

| | | |
|---|---|---|
| 2018/0206178 A1 | 7/2018 | Tenny et al. |
| 2018/0279387 A1* | 9/2018 | Hui ........................ H04W 88/02 |

(Continued)

OTHER PUBLICATIONS

Ericsson: "Stored and Indexed System Information", 3GPP Draft; R2-1706496 Stored and Indexed System Information, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017 (Jun. 26, 2017), XP051301001, 5 pages, chapters 1, 2.

(Continued)

*Primary Examiner* — Yee F Lam
(74) *Attorney, Agent, or Firm* — Haynes and Boone, LLP

(57) ABSTRACT

Wireless communication systems and methods related to enhancing initial access for multi-beam operations. A user equipment (UE) selects a synchronization signal block (SSB) that corresponds to a beam and has a reference signal received power (RSRP) above a threshold. The UE receives a system information block (SIB) that includes a plurality of SSB and beam-specific system information pairs. The UE selects beam-specific system information by matching the selected SSB to one of SSBs in the multiple SSB and beam-specific system information pairs. The UE establishes a connection with a base station (BS) using the beam-specific system information.

19 Claims, 6 Drawing Sheets

Related U.S. Application Data

(60) Provisional application No. 62/706,947, filed on Sep. 18, 2020.

(56) References Cited

U.S. PATENT DOCUMENTS

| | | | |
|---|---|---|---|
| 2018/0368189 A1 | 12/2018 | Narasimha et al. | |
| 2019/0110300 A1* | 4/2019 | Chen | H04W 74/02 |
| 2019/0289639 A1* | 9/2019 | Frenger | H04W 72/046 |
| 2020/0145089 A1* | 5/2020 | Wei | H04W 76/27 |
| 2020/0146069 A1* | 5/2020 | Chen | H04W 76/11 |
| 2021/0058971 A1* | 2/2021 | MolavianJazi | H04L 5/0044 |
| 2022/0046523 A1 | 2/2022 | Nam et al. | |
| 2022/0046724 A1* | 2/2022 | Maso | H04W 74/0833 |
| 2022/0095293 A1 | 3/2022 | He et al. | |

OTHER PUBLICATIONS

International Preliminary Report on Patentability—PCT/US2021/049941 The International Bureau of WIPO—Geneva, Switzerland, Mar. 30, 2023.
International Search Report and Written Opinion—PCT/US2021/049941—ISA/EPO—Jan. 4, 2022.

\* cited by examiner

200 ↘

| SSB1 | Beam-Specific System Information 1 | 202_1 |
| SSB2 | Beam-Specific System Information 2 | 202_2 |
| SSB3 | Beam-Specific System Information 3 | 202_3 |
| SSB4 | Beam-Specific System Information 4 | 202_4 |
| SSB5 | Beam-Specific System Information 5 | 202_5 |
| SSB6 | Beam-Specific System Information 6 | 202_6 |
| SSB7 | Beam-Specific System Information 7 | 202_7 |
| SSB8 | Beam-Specific System Information 8 | 202_8 |

FIG. 2

ENHANCED INITIAL ACCESS WITH MULTI-BEAM OPERATIONS

CROSS-REFERENCE TO RELATED APPLICATIONS

The present application is a divisional application of U.S. application Ser. No. 17/305,199, filed Jul. 1, 2021, which claims priority to and the benefit of U.S. Provisional Application No. 62/706,947, titled "ENHANCED INITIAL ACCESS WITH MULTI-BEAM OPERATIONS," filed Sep. 18, 2020, each of which is hereby incorporated by reference in its entirety as if fully set forth below and for all applicable purposes.

TECHNICAL FIELD

This application relates to wireless communication systems, and more particularly to enhancing access to beams within a serving cell.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

When a UE connects a BS in a new serving cell, the UE reads system information which is periodically transmitted by the UE to obtain configuration parameters of the BS. When a BS supports multi-beam operations, the BS periodically transmits beams as bursts of synchronization blocks or SSBs that point in different directions. These SSBs include system information. The UE tries to obtain the system information by searching for different SSBs and detecting the SSB with a strong reference signal received power (RSRP). After the UE detects a strong SSB, the UE obtains the system information from the system information block(s) (SIB) that is included in the SSB. The system information may include access barring information, access control information, and information for performing a random access channel (RACH) procedure with the BS. The UE then uses the system information to establish a connection with the BS.

In some cases, the UEs may not be evenly distributed in the serving cell. In this case, the UEs may cause an access overload when multiple UEs in one portion of the cell are trying to connect to the BS using the same beam or beams. The aspects below describe techniques for reducing or eliminating the access overload when the UEs are not evenly distributed in the serving cell. Moreover, the aspects below describe techniques that are backward compatible with the legacy UEs and BSs. This is because replacing the software on all UEs and BSs is both impractical and expansive. In this way, the UEs executing the new software (the new UEs) may use techniques that prevent access overload) while the legacy UEs (the UEs executing legacy software) may use existing techniques.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the disclosure are directed to a method of wireless communication, comprising selecting, at a user equipment (UE), a synchronization signal block (SSB) having a reference signal received power (RSRP) above a threshold, wherein the SSB corresponds to a beam, receiving a system information block (SIB) that includes a plurality of SSB and beam-specific system information pairs, selecting a beam-specific system information by matching the selected SSB to one of SSBs in the plurality of SSB and beam-specific system information pairs, and establishing a connection with a base station (BS) using the beam-specific system information.

Further aspects of the disclosure are directed to method of wireless communication, comprising generating, at a base station (BS), a structure that includes a plurality of SSB and beam-specific system information pairs, wherein a beam-specific system information includes system information for establishing a connection with the BS that is specific to a beam in a plurality of beams transmitted by the BS, storing the structure in a system information block (SIB), and broadcasting the SIB to a plurality of user equipments (UEs) in a serving cell.

Further aspects of the disclosure are directed to a user equipment (UE), comprising a transceiver configured to receive a system information block (SIB) that includes a plurality of SSB and beam-specific system information pairs, and a processor configured to: select a synchronization signal block (SSB) having a reference signal received power (RSRP) above a threshold, wherein the SSB corresponds to a beam, select a beam-specific system information by matching the selected SSB to one of SSBs in the plurality of SSB and beam-specific system information pairs, and establish a connection with a base station (BS) using the beam-specific system information.

Further aspects of the disclosure are directed to a base station (BS), comprising a processor configured to: generate a structure that includes a plurality of SSB and beam-specific system information pairs, wherein a beam-specific system information includes system information for establishing a connection with the BS that is specific to a beam in a plurality of beams transmitted by the BS, and store the structure in a system information block (SIB), and transceiver configured to broadcast the SIB to a plurality of user equipments (UEs) in a serving cell.

Further aspects of the disclosure are directed to a non-transitory computer-readable medium having program code recorded thereon, the program code comprising code for selecting, at a user equipment (UE), a synchronization signal block (SSB) having a reference signal received power (RSRP) above a threshold, wherein the SSB corresponds to a beam, code for receiving a system information block (SIB) that includes a plurality of SSB and beam-specific system information pairs, code for selecting a beam-specific system information by matching the selected SSB to one of SSBs in the plurality of SSB and beam-specific system information pairs, and code for establishing a connection with a base station (BS) using the beam-specific system information.

Further aspects of the disclosure are directed to a non-transitory computer-readable medium of wireless communication, comprising code for generating, at a base station (BS), a structure that includes a plurality of SSB and beam-specific system information pairs, wherein a beam-specific system information includes system information for establishing a connection with the BS that is specific to a beam in a plurality of beams transmitted by the BS, code for storing the structure in a system information block (SIB), and code for broadcasting the SIB to a plurality of user equipments (UEs) in a serving cell.

Further aspects of the disclosure are directed to an apparatus for wireless communication, comprising, means for selecting, at a user equipment (UE), a synchronization signal block (SSB) having a reference signal received power (RSRP) above a threshold, wherein the SSB corresponds to a beam, means for receiving a system information block (SIB) that includes a plurality of SSB and beam-specific system information pairs, means for selecting a beam-specific system information by matching the selected SSB to one of SSBs in the plurality of SSB and beam-specific system information pairs, and means for establishing a connection with a base station (BS) using the beam-specific system information.

Further aspects of the disclosure are directed to an apparatus for wireless communication, comprising means for generating, at a base station (BS), a structure that includes a plurality of SSB and beam-specific system information pairs, wherein a beam-specific system information includes system information for establishing a connection with the BS that is specific to a beam in a plurality of beams transmitted by the BS, means for storing the structure in a system information block (SIB), and means for broadcasting the SIB to a plurality of user equipments (UEs) in a serving cell.

BRIEF DESCRIPTION OF THE DRAWINGS

FIG. 2 is a block diagram of a structure that includes synchronization signal block and beam-specific system information pairs, according to aspects of the disclosure.

DETAILED DESCRIPTION

Figure 1:
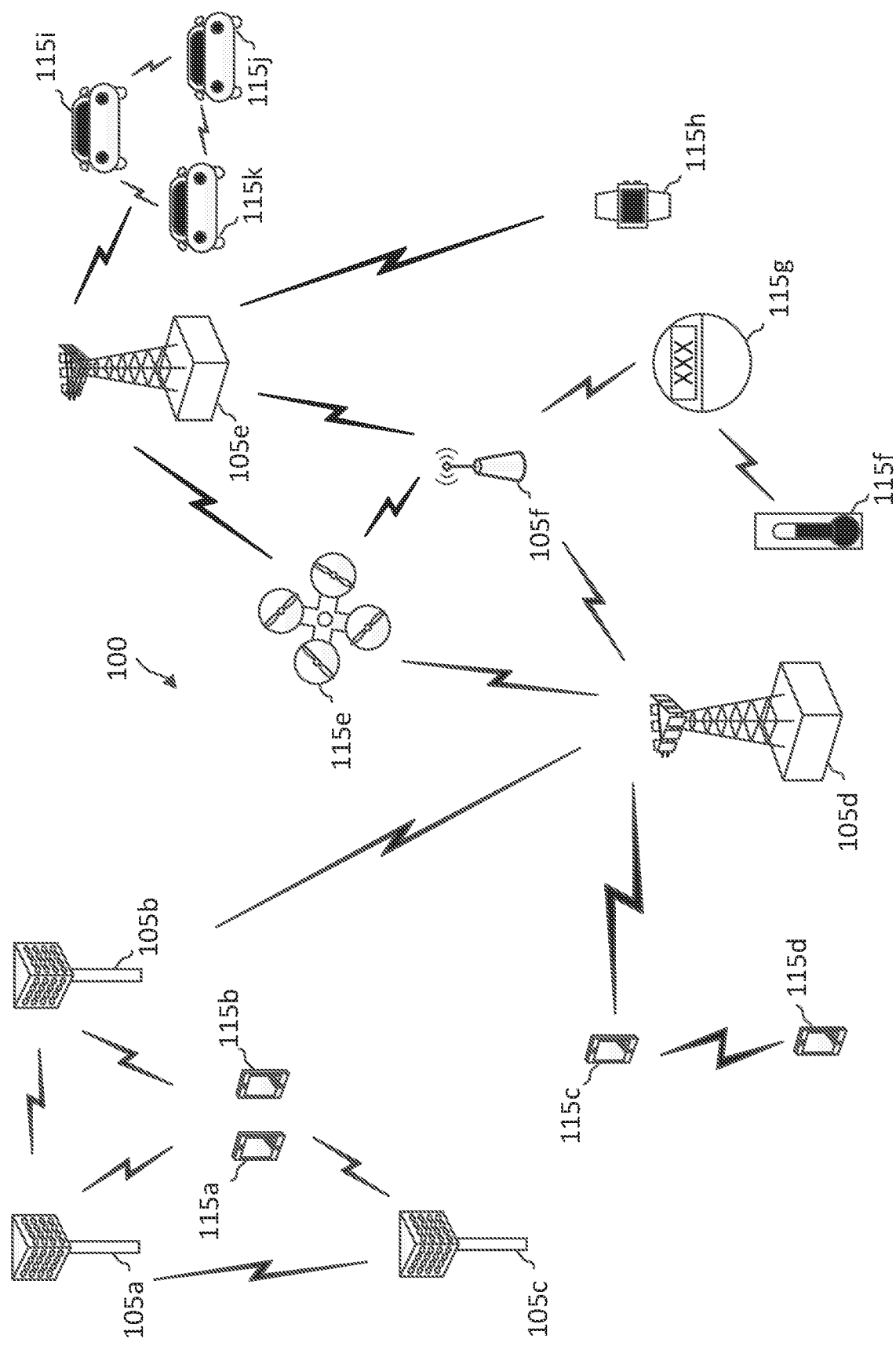
FIG. 1 illustrates a wireless communication network, according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some aspects, when UE connects to a BS in a new serving cell, the UE may obtain system information that is periodically transmitted by the BS, and then use the system information to obtain different configuration parameters. The configuration parameters may include parameters that are associated with access control and parameters for establishing a random access channel (RACH) procedure that establishes a connection between the UE to BS.

In some aspects, the serving cell may support multi-beam operations. In the multi-beam operations, the BS may transmit beams that include synchronization signal blocks (SSBs) in multiple directions in the cell. The UE receives SSBs from different beams and selects the SSB and the corresponding beam with a strong reference signal received power (RSRP). A strong RSRP may be an RSRP above a threshold. The UE may then use the beam to obtain system information that corresponds to access control and RACH procedure that the BS may transmit using one or more system information blocks (SIB s).

In some aspects, the UEs within a serving cell may not be distributed evenly throughout the cell. In this case, the BS may be overloaded by too many UEs attempting to access the BS on a single beam and use the same access control and RACH procedure parameters to connect to the BS. To reduce or eliminate the overload, the techniques below describe reconfiguring system resources such that more resources are directed to a portion of the cell that includes more UEs. Specifically, the techniques describe reconfiguring the access control and RACH resources in a way that is compatible with both new and legacy UEs.

FIG. 1 illustrates a wireless communication network 100 according to some aspects of the present disclosure. The network 100 may be a 5G network. The network 100 includes a number of base stations (BSs) 105 (individually labeled as 105$a$, 105$b$, 105$c$, 105$d$, 105$e$, and 105$f$) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

UEs 115 may also be new or legacy UEs. The new UE 115 may include a version of the software that is compatible with a new or latest release of a corresponding standard. The legacy UE 115 may include software that is compatible with an older or not current version of the latest standard.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast control channel (PBCCH) and may broadcast the RMSI and/or the OSI over a physical downlink shared channel (PDSCH).

In some aspects, a UE 115 attempting to access the network 100 may perform an initial cell search by detecting a PSS. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response.

In some aspects, when UE 115 is attempting to connect to a new cell, the UE 115 may first read system information. The system information may be transmitted or broadcasted by BS 105 associated with the serving cell periodically, that is at configurable time intervals. The system information may include configuration parameters that UE 115 may use to access BS 105. Example configuration parameters may indicate whether the UE may access BS 105 or whether UE 115 belongs to a type or category which has been barred from accessing BS 105. Example configuration parameters may also be access control parameters. Additionally, example configuration parameters may be RACH parameters that the UE 115 may use to perform random access (RACH) procedure that connects the UE 115 to BS 105. The system information may be included in multiple system information blocks (SIBs). In some instances, the first SIB or SIB1 may contain information that UE 115 may use to obtain other SIBs.

In some aspects, BS 105 of a serving cell may support a multi-beam operation. In the multi-beam operation, BSs 105 may transmit multiple beams that point in different directions in the cells. The beams may comprise electro-magnetic waves and are able to transmit more information than conventional radio waves. In some aspects, BS 105 may periodically transmit a burst of system signal blocks (SSBs) on each beam. Because the beams point in different directions, the SSBs are also transmitted in different directions within a serving cell. Additionally, BS 105 may transmit the packet broadcast control channel (PBCCH) using the same beam as each of the SSBs. For example, if BS 105 transmits eight SSBs, then PBCCH may be repeated in the same directions as each of the eight SSBs.

In some aspects, when UE 115 attempts to obtain the system information, the UE 115 searches in different directions for a suitable SSB. A suitable SSB may be an SSB with a strong reference signal received power (RSRP), that is the RSRP above a configurable threshold, such as −44 dbm. After the UE 115 detects a suitable SSB, the UE 115 may obtain system information advertised on the PBCCH spatially co-located with that SSB.

In some aspects, each RACH occasion is associated with an SSB. Accordingly, when EU performs a RACH procedure, the UE 115 may select the RACH occasion associated with the selected SSB. Based on the RACH occasion that the UE 115 uses to transmit the random access request to BS 105, BS 105 may identify a preferred beam of the UE 115.

In conventional wireless communication systems, a conventional BS transmits the same system information on all beams. In this way, the same configuration parameters are applied to all UEs 115. This may pose connectivity issues when UEs 115 are not evenly distributed throughout the serving cell. UEs 115 may not be evenly distributed when, for example, UEs 15 that are smart meters are located in a housing complex that covers one portion of the serving cell. In another example, UEs 115 may not be evenly distributed when a portion of a serving cell is a venue that hosts concerts or sport games and occasionally fills with thousands of users that carry UEs 115. In some instances, when the serving cell has UE barring enabled and the portion of the cell is overloaded with UEs 115, all UEs 115 may be barred from connecting to the BS 105. In other instances, the RACH resources may be overloaded with UEs in one portion of the cell request the same RACH resources. The aspects below describe that when different parts of the cell have different random access load, BS 105 may configure the physical RACH (PRACH) resources to alleviate the load. For example, the aspects below describe how BS 105 may configure more PRACH resources in the direction that points to a portion of the serving cell that has a high access load.

In some aspects, to reduce or eliminate the system overload, BS 105 may be configured to transmit different parameters in the system information on different beams. In this way, if UEs 115 are unevenly distributed in the serving cell, the UEs 115 may communicate using different beams with different configuration parameters and without overloading the serving cell. Example parameter may be uac-BarringInfo parameter for access barring and access control. Another example parameter may be RACH-ConfigGeneric parameter that stores different random access parameters. Within RACH-ConfigGeneric, the beam specific parameters may be prach-ConfigurationIndex, scalingFactorBI, totalNumberOfRA-Preambles, and ssb-perRACH-OccasionAndCB-PreamblesPerSSB parameters. Further, not all RACH parameters may be beam specific, and some RACH parameters may be common to all beams.

As discussed above, the UEs 115 may be new or legacy UEs. The new UEs 115 may include software that may process the system information that allows the UEs 115 to communicate using different parameters in the system information for different beams. The legacy UEs 115 however, may execute using legacy software that may process the same parameters in the system information for different beams. The aspects below describe techniques that cause the new UE 115 to use beam-specific system information and for legacy UEs 115 to use legacy system information to connect to BS 105.

In some aspects, to ensure legacy compatibility, BS 105 may add an extension field to one of SIBs. For example purposes only, the extension field may be added to SIB1. The extension field may be an existing field have been designated for use in future releases and is ignored by the legacy UEs 115. In some aspect, the extension field may store a structure, such as a table. The structure may include pairs, where each pair comprises an SSB and beam-specific system information for the SSB. The beam-specific system information may include access barring or access control parameters, such as uac-BarringInfo. The beam-specific system information may also include random access parameters, such as RACH-ConfigGeneric, prach-ConfigurationIndex, scalingFactorBI, totalNumberOfRA-Preambles, and ssb-perRACH-OccasionAndCB-PreamblesPerSSB. This approach ensures that the SIB1 is the same across different beams, and the UEs 115 may receive and combine the SIB1 transmitted on different beams to acquire the SIB1 more quickly than when the SIB1 is transmitted on a single beam.

In some aspects, the structure or a table may be stored in another portion of SIB1 and not in the extension field discussed above.

In addition to the extension field, BS 105 may also include one or more fields that store legacy system information in the legacy portion of the SIB1. The system information in the legacy portion of the SIB1 is accessible to legacy UEs 115 or to new UEs 115. However, the beam-specific system information in the extension field is ignored by the legacy UEs 115. The beam-specific system information, however, may override the legacy system information in the new UEs 115. Once BS 105 includes the structure in the extension field in the SIB1 and the legacy system information in another field(s) in SIB1, BS 105 may broadcast SIB1 to UEs 115 on different beams.

In some aspects, when new or legacy UE 115 is accessing the serving cell, UE 115 may receive the SSBs that are broadcasted by BS 105 in a serving cell on different beams. The UE 115 may select an SSB with an RSRP above a configured threshold as a serving beam. When multiple SSBs have RSRPs above a configured threshold, UE 115 may select the SSB that corresponds to a highest RSRP or the first SSB that corresponds to the RSRP above the configured threshold. The UE 115 may then receive SIB1 on one or more beams.

The legacy UE 115 may simply use the system information in the legacy portion of the SIB1 to establish a connection with BS 105 over the selected SSB. The new UE 115 may access the extension field in SIB1 and retrieve the structure or a table that stores SSB and beam-specific system information pairs. The new UE 115 may then match the selected SSB to one of the SSBs in the SSB and beam-specific system information pairs and retrieve the corresponding beam-specific system information. The new UE 115 may then establish a connection with BS 105 using the system information, including the access barring or access control parameters and the random access parameters included in the beam-specific system information.

In some aspects, when the new UE 115 does not match the selected SSB to one of the SSBs in the SSB and beam-specific system information pairs and is unbale to retrieve the beam-specific system information, the new UE 115 may retrieve the system information from the legacy portion of the SIB1. The new UE 115 may then use the legacy system information to establish a connection with BS 105.

In some aspects, UE 115 may change beams. This may occur when another SSB that UE 115 receives has a higher or stronger RSRP, of if the RSRP of the SSB for the beam that the UE 115 communicates on falls below the threshold. In these cases, the new UE 115 may re-establish a connection with BS 105 as discussed above on a different beam with different beam-specific system information.

FIG. 2 is a block diagram of a structure 200 that stores beam-specific system information, according to aspects of the disclosure. As discussed above, structure 200 may be included in an extension field in SSB1 or another field that may be ignored by the legacy UE 115. In some aspects, structure 200 may be a table or another configuration structure. Structure 200 may include multiple pairs, such as pairs 202_1 to 202_8. Each pair in pairs 202_1 to 202_8 may correspond to a beam. Each pair may associate an SSB identification (ID) with a beam-specific information. For example, using structure 200, BS 105 may transmit eight beams within a serving cell. Each pair 202_1 to 202_8 may include an SSB ID and beam-specific system information associated with the SSB. For example, pair 202_2 may include beam-specific system information 2 for SSB2 that may be transmitted on beam 2, where the ID for SSB2 is indicated as 2. In another example, pair 202_8 may include beam-specific system information for SSB8 that may be transmitted on beam 8.

Going back to FIG. 1, in an alternative embodiment, instead of including the structure 200 in the extension field or another field in SSB1, the memory of the UE 115 may be configured or pre-configured with one or more structures 200. For example, the UE 115 may store the structures 200 in its SIM card or another memory. The structure 200 may be indexed or associated with a structure identifier. In this case, when BS 105 transmits an RSRP for an SSB that is above a configurable threshold, the UE 115 may select the SSB and then use SIB1 to retrieve the beam-specific system information from one of the structures stored in the UE 115.

In this case, the extension field or another field in the SIB1 may store an index of the structure that the new UE 115 may use to access the structure 200 stored in its memory, and then use the SSB to select the beam-specific system information from one of the pairs in structure 200.

Figure 3:
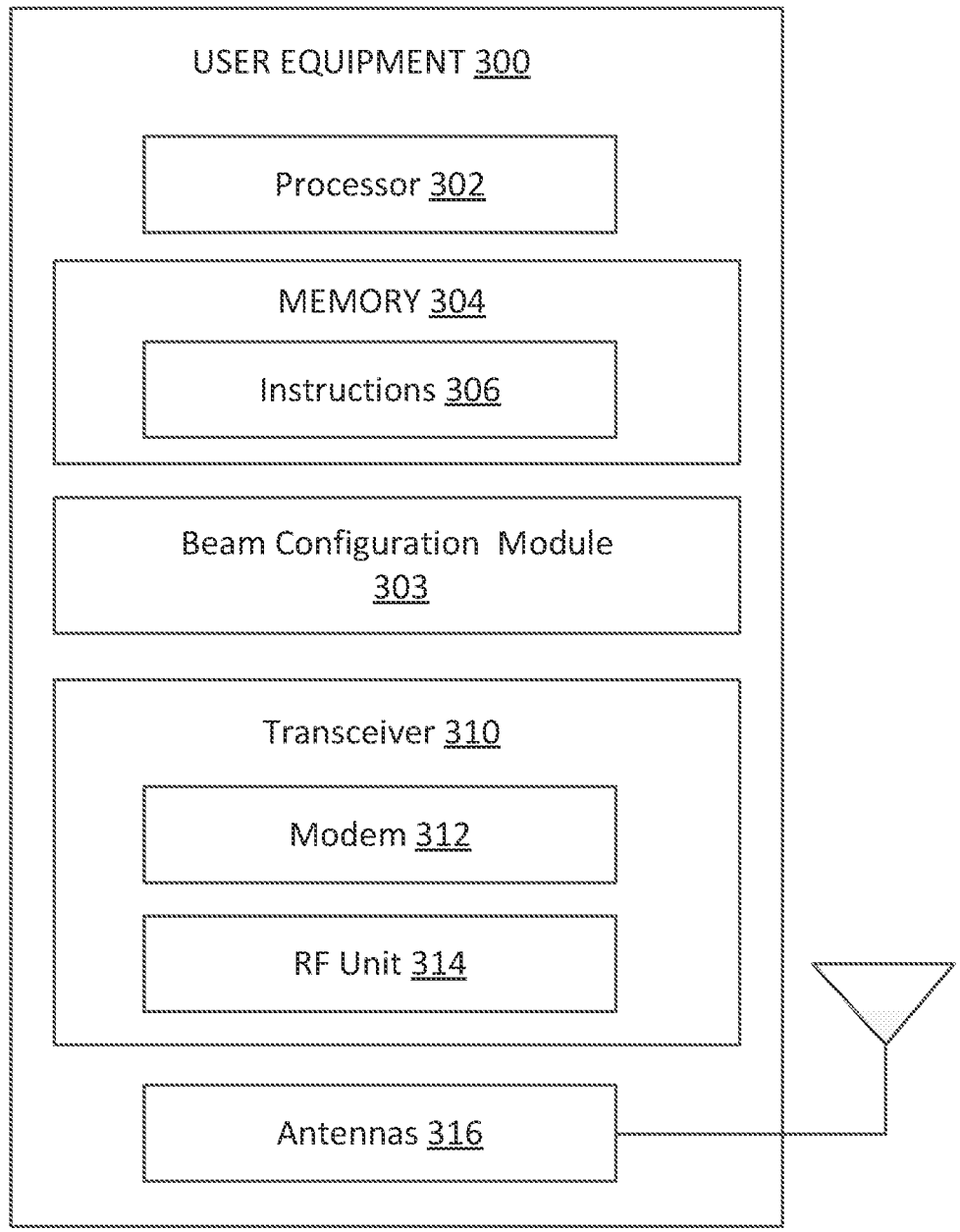
FIG. 3 is a block diagram of an exemplary user equipment (UE) according to aspects of the disclosure.

FIG. 3 is a block diagram of an exemplary UE 300 according to embodiments of the disclosure. As shown, the UE 300 may include a processor 302, a memory 304, beam configuration module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 304 includes a non-transitory computer-readable medium. The memory 304 may store instructions 306. The instructions 306 may include instructions that, when executed by the processor 302, cause the processor 302 to perform the operations described herein with reference to the UEs 300 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Memory 304 may also store beam configuration module 308. Beam configuration module 308 may decode a structure, such as SIB1, including an extension field that stores a structure with SSB and beam-specific system information pairs. If UE 300 is a legacy UE, the beam configuration module 308 may ignore the extension field, and instead decode legacy system information for the beam included in a legacy portion of the SIB. On the other hand, if UE 300 is a new UE, the beam configuration module 308 may access the extension field or another field that stores structure 200 and determine the SSB and beam-specific system information pair that matches to the SSB selected by the UE 300. Beam configuration module 308 may then determine the beam-specific system information from the pair and use the beam-specific system information to connect to the BS 105 using the beam.

As shown, the transceiver 310 may include the modem subsystem 312 and the RF unit 314. The transceiver 310 can be configured to communicate bi-directionally with other devices, such as the BS s 105. The modem subsystem 312 may be configured to modulate and/or encode the data from the memory 304 and/or beam configuration module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 510, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
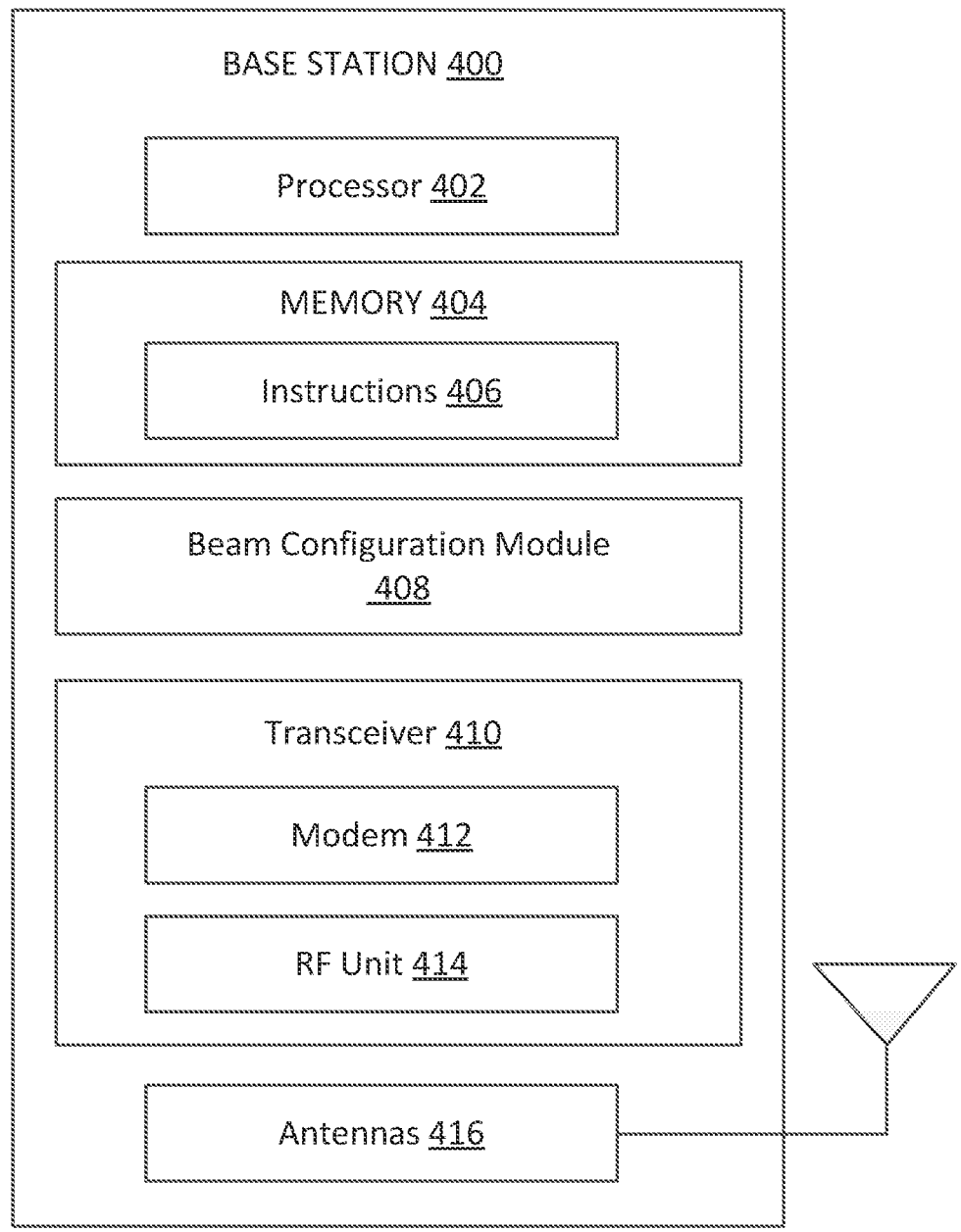
FIG. 4 is a block diagram of an exemplary base station (BS) according to aspects of the disclosure.

FIG. 4 is a block diagram of an exemplary BS 400 according to embodiments of the present disclosure. The BS 400 may be a BS 105 as discussed above. A shown, the BS 400 may include a processor 402, a memory 404, beam configuration module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The beam configuration module 408 may be used for various aspects of the disclosure. BS 105 may use the beam configuration module 408 to generate a structure or a table with different SSB and beam-specific system information pairs. An SSB in each pair corresponds to a particular beam-specific system information that the UE 115 may use to connect to BS 105. Beam configuration module 408 may also include the structure or a table into the extension field in SSB1 that BS 105 transmits to UEs 115 or into another field in SSB1 that is ignored by the legacy UEs 115, 300. For legacy UEs 115, beam configuration module 408 may also include legacy system information into a legacy portion of the SIB1.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 104 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with UE 115, 300 according to embodiments of the disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
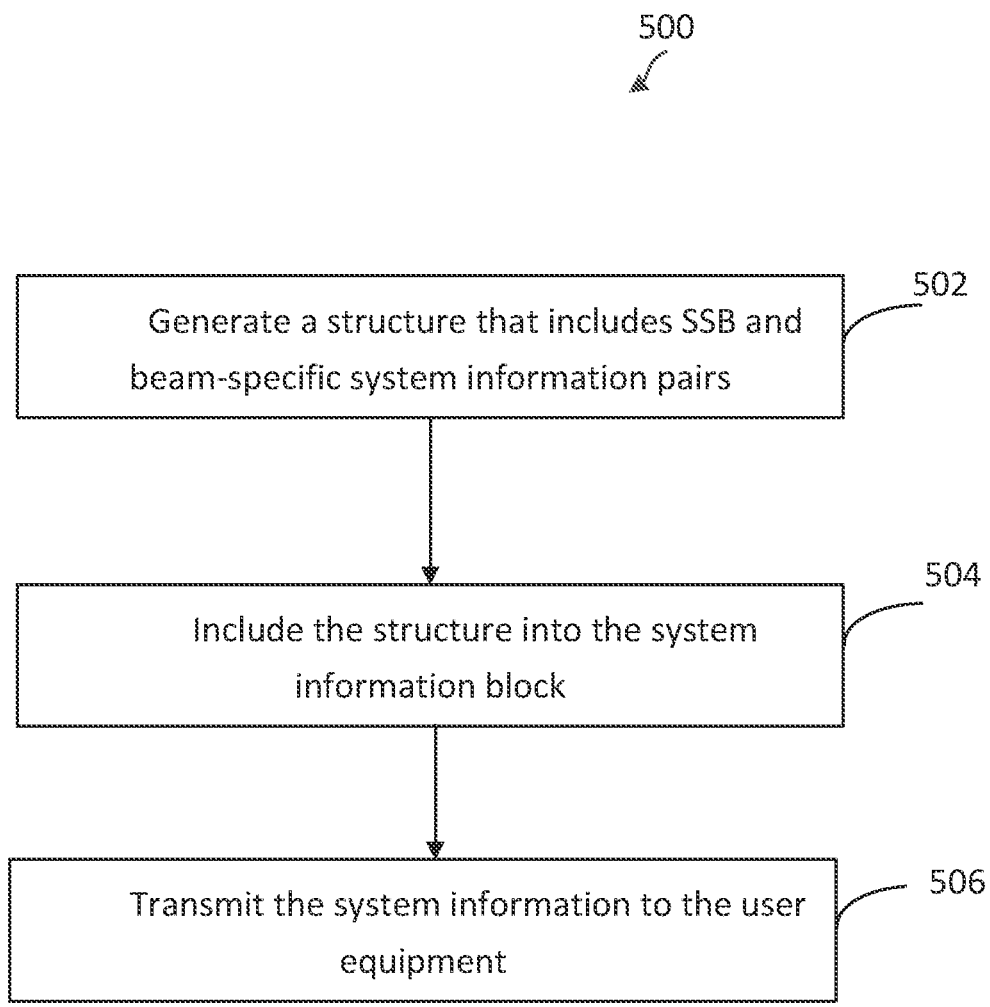
FIG. 5 is a flow diagram for generating the beam-specific system information, according to aspects of the present disclosure.

FIG. 5 is a flow diagram of a method 500 according to some aspects of the disclosure. Steps of the method 500 can be executed by a computing device (e.g., a processor, processing circuit, and/or other suitable component) of a wireless communication device or other suitable means for performing the steps. For example, a communication device, such as the BS 105 may utilize one or more components, such as the processor 402, the memory 404, beam configuration module 408, the transceiver 410, the modem 412, and the one or more antennas 416, to execute the steps of method 500. As illustrated, the method 500 includes a number of enumerated steps, but aspects of the method 500 may include additional steps before, after, and in between the enumerated steps. In some aspects, one or more of the enumerated steps may be omitted or performed in a different order.

At step 502, a structure that stores SSB and beam-specific system information pairs is generated. For example, beam configuration module 408 may generate structure 200, such as a table, that includes SSB and beam-specific system information pairs. The beam-specific system information includes information that UE 115 may use to connect to BS 105 using the beam that corresponds to the SSB. Beam-specific system information corresponds to a particular beam in the cell. Example beam-specific system information may include parameters such as uac-BarringInfo for access barring and access control and RACH-ConfigGeneric for random access procedure. In some embodiments, BS 105 may generate the structure 200 and then store the structure 200 in memory.

At step 504, the structure is included in the SIB1. For example, SIB1 may include an extension field. This extension field is ignored by the legacy UE 115 but may be decoded by the new UEs 115. BS 105 may store the structure 200 in the extension field in SIB1 or another field that is ignored by the legacy UE 115. Additionally, BS 105 may also include system information in the legacy portion of the SIB1 that may be used by the legacy UEs 115 to connect to BS 105.

At step 506, the SIB1 is transmitted. For example, BS 105 transmits SIB1 to UEs 115 in the cell. In some instances, BS 105 transmits SIB1 periodically on different SSBs, so that the new and legacy UEs 115 may detect the SIB1 and use the system information to connect to BS 105 on one of the beams.

Figure 6:
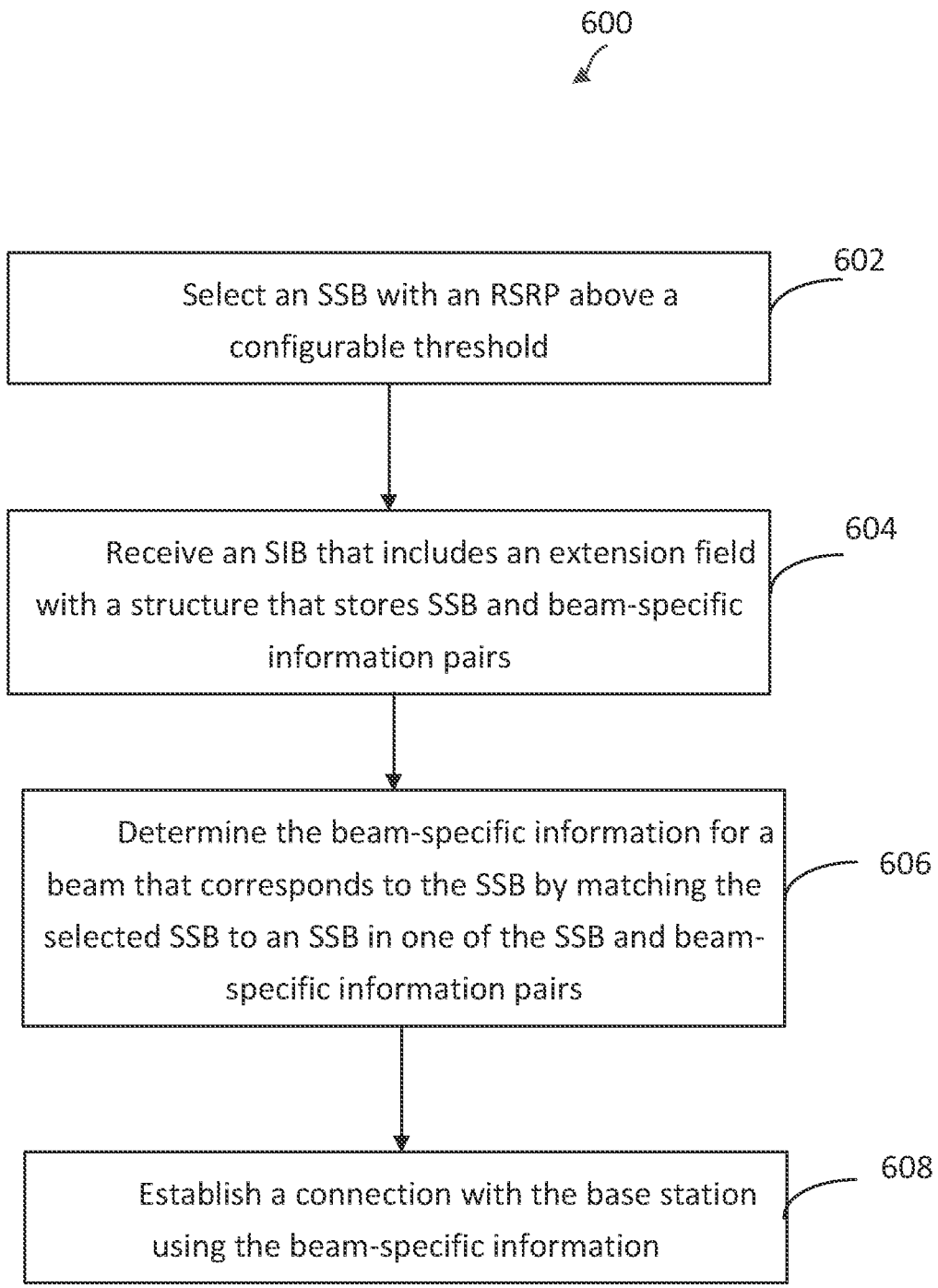
FIG. 6 is a flow diagram for establishing a connection using the beam-specific system information, according to aspects of the present disclosure.

FIG. 6 is a flow diagram of a method 600 according to some aspects of the present disclosure. Steps of the method 600 can be executed by a computing device (e.g., a processor, processing circuit, and/or other suitable component) of a wireless communication device or other suitable means for performing the steps. For example, a wireless communication device, such as the UE 115 may utilize one or more components, such as the processor 302, the memory 304, beam configuration module 308, the transceiver 310, the modem 312, and the one or more antennas 316, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, the UE selects an SSB. For example, either the new or legacy UE 115 selects an SSB based on the RSRP being above a configured threshold. As discussed above, each SSB corresponds to a beam, and by selecting an SSB, the UE 115 selects a beam that UE 115 may use to connect to the BS 105.

At step 604, the UE receives an SIB1. For example, the new or legacy UE 115 receives the SIB1 either on the beam that corresponds to the SSB or on a subset of beams of a serving cell. In some instances, the SIB1 may be transmitted on multiple SSBs and UE 115 may combine portions of SIB1 received on different SSBs so that the UE 115 may more quickly acquire an SIB1.

At step 606, a system information is retrieved by the new or legacy UE. For example, the new UE 115 may access the extension field in the SIB1, and retrieve structure 200, such as a table, that includes the SSB and beam-specific system information pairs. From the table, new UE 115 may match the SSB selected in step 602 to the SSB in one of the SSB and beam-specific system information pairs. The new UE 115 may then select the beam-specific system information that corresponds to the matched SSB. If the new UE 115 is unable to match the SSB selected in step 602 to one of the SSBs in the SSB and beam-specific system information pairs, the new UE 115 may retrieve legacy system information in the SIB1, as discussed below. Alternatively, the legacy UE 115 may ignore the structure 200 in the extension field. Instead, the legacy UE 115 may select the legacy system information for the beam that is included in the legacy portion of the SIB1. Because the legacy UE 115 ignores the extension field in the SIB1, the legacy UE 115 does not access structure 200 that includes the beam-specific system information that is accessible to the new UE 115. Similarly, the beam-specific system information that the new UE 115 retrieves from the table in the extension field may override the legacy system information in the SIB1 that is used by the legacy UE 115. In this way, the beam-specific system information enhancements may reduce access overload when the UEs 115 are not distributed evenly throughout the cell. At the same time, the enhancements are backward compatible and do not prevent the legacy UE 115 from connecting to BS 105 in the serving cell using the legacy system information included in SIB1.

At step 608, the new or legacy UE 115 connect to the BS. For example, the new UE 115 may use the beam-specific system information, such as the uas-BarringInfo parameter, for access barring and access control to the serving cell over the beam that corresponds to the SSB. The new UE 115 may also use the RACh-ConfigGeneric parameters to perform RACH procedure with the BS 105. Similarly, the legacy UE 115 may use the parameters in the legacy system information included in the legacy portion of the SIB1 for access barring and access control and also for performing random access procedure on the beam that corresponds to the SSB. As discussed above, the legacy system information may be the same for all beams in the serving cell. Notably, if the new UE 115 is unable to select beam-specific system information for the SSB, the new UE 115 may also use the legacy system information to connect to BS 105.

By way of non-limiting examples, the following aspects are included in the present disclosure.

Aspect 1 includes a method of wireless communication performed by a user equipment (UE), the method comprising selecting a synchronization signal block (SSB) having a reference signal received power (RSRP) above a threshold, wherein the SSB corresponds to a beam; receiving a system information block (SIB) that includes a plurality of SSB and beam-specific system information pairs; receiving a system information block (SIB) that includes a plurality of pairs, each pair indicating an SSB ID and beam-specific system information; and establishing a connection with a base station (BS) using the beam-specific system information.

Aspect 2 includes the method of aspect 1, wherein the SIB includes an extension field with a table that stores the plurality of SSB and beam-specific system information pairs.

Aspect 3 includes the method of any of aspects 1-2, wherein the beam-specific system information includes access control information.

Aspect 4 includes the method of any of aspects 1-3, wherein the access control information includes an indication that determines whether the BS is accessible to the UE.

Aspect 5 includes the method of any of aspects 1-4, wherein the access control information includes information for accessing the BS.

Aspect 6 includes the method of any of aspects 1-5, wherein the beam-specific system information includes random access channel (RACH) information for initiating a RACH procedure.

Aspect 7 includes the method of any of aspects 1-6, wherein the RACH information includes at least one of: a prach-ConfigurationIndex; a scalingFactorBI; a totalNumberOfRA-Preambles; or a ssb-perRACH-OccasionAndCB-PreamblesPerSSB parameter.

Aspect 8 includes the method of any of aspects 1-7, further comprising selecting a second SSB, wherein the second SSB corresponds to a second beam; selecting a second beam-specific system information by matching the selected second SSB to another SSB in the plurality of pairs, each pair indicating an SSB ID and beam-specific system information; and establishing a second connection with the BS using the second beam-specific system information.

Aspect 9 includes a method of wireless communication performed by a base station (BS), the method comprising generating a system information block (SIB) comprising a structure that includes a plurality of pairs, each pair indicating an SSB ID and beam-specific system information, wherein a beam-specific system information includes system information for establishing a connection with the BS that is specific to a beam of a plurality of beams transmitted by the BS; and broadcasting the SIB to a plurality of user equipments (UEs) in a serving cell.

Aspect 10 includes the method of aspect 9, wherein the SIB includes an extension field that includes the structure.

Aspect 11 includes the method of any of aspects 9-10, wherein the beam-specific system information includes access control information.

Aspect 12 includes the method of any of aspects 9-11, wherein the access control information includes an indicator that indicates whether the BS is accessible to a UE of the plurality of UEs.

Aspect 13 includes the method of any of aspects 9-12, wherein the access control information includes information for accessing the BS.

Aspect 14 includes the method of any of aspects 9-13, wherein the beam-specific system information includes random access channel (RACH) information for initiating a RACH procedure.

Aspect 15 includes the method of any of aspects 9-14, wherein the RACH information includes at least one of: a prach-ConfigurationIndex; a scalingFactorBI; a totalNumberOfRA-Preambles; or a ssb-perRACH-OccasionAndCB-PreamblesPerSSB parameter.

Aspect 16 includes the method of any of aspects 9-15, further comprising receiving a first access request from a first UE of the plurality of UEs on a first beam, wherein the first access request includes a first beam-specific system information; and receiving a second access request from a second UE of the plurality of UEs on a second beam, wherein the second access request includes a second beam-specific system information.

Aspect 17 includes the method of any of aspects 9-16, further comprising receiving a first access request from a first UE of the plurality of UEs on a first beam, wherein the first access request includes a first beam-specific system information; and receiving a second access request from a second legacy UE of the plurality of UEs on the first beam, wherein the second access request includes legacy system information.

Aspect 18 includes a user equipment (UE) comprising a transceiver, a memory, and a processor coupled to the transceiver and the memory, the UE configured to perform any one of aspects 1-8.

Aspect 19 includes a base station (BS) comprising a transceiver, a memory, and a processor coupled to the transceiver and the memory, the BS configured to perform any one of aspects 9-17.

Aspect 20 includes a non-transitory computer-readable medium storing one or more instructions for wireless communication, the one or more instructions comprising one or more instructions that, when executed by one or more processors of a user equipment, cause the one or more processors to perform any one of aspects 1-8.

Aspect 21 includes a non-transitory computer-readable medium storing one or more instructions for wireless communication, the one or more instructions comprising one or more instructions that, when executed by one or more processors of a base station, cause the one or more processors to perform any one of aspects 9-17.

Aspect 22 includes a user equipment (UE) comprising one or more means to perform any one or more of aspects 1-8.

Aspect 23 includes a base station (BS) comprising one or more means to perform any one or more of aspects 9-17.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a wireless communication device, the method comprising:
generating a system information block (SIB) comprising a structure that includes:
first system information associated with a plurality of SSB identifiers (IDs) and a first UE software type; and
second system information associated with a second UE software type, the second system information comprising a plurality of pairs including a first pair and a second pair, the first pair indicating a first SSB ID and first beam-specific system information associated with the first SSB ID, the second pair indicating a second SSB ID and second beam-specific system information associated with the second SSB ID, wherein each of the first beam-specific system information and the second beam-specific system information includes system information for establishing a connection with the wireless communication device that is specific to a beam of a plurality of beams transmitted by the wireless communication device; and broadcasting the SIB to a plurality of user equipments (UEs) in a serving cell.

2. The method of claim 1, wherein:
the SIB includes an extension field that includes the structure.

3. The method of claim 1, wherein at least one of the first beam-specific system information or the second beam-specific system information includes access control information.

4. The method of claim 3, wherein the access control information includes an indicator that indicates whether the wireless communication device is accessible to a UE of the plurality of UEs.

5. The method of claim 3, wherein the access control information includes information for accessing the wireless communication device.

6. The method of claim 1, wherein at least one of the first beam-specific system information or the second beam-specific system information includes random access channel (RACH) information for initiating a RACH procedure.

7. The method of claim 6, wherein the RACH information includes at least one of:
a prach-ConfigurationIndex;
a scalingFactorBI;
a totalNumberOfRA-Preambles; or
a ssb-perRACH-OccasionAndCB-PreamblesPerSSB parameter.

8. The method of claim 1, further comprising:
receiving a first access request from a first UE of the plurality of UEs on a first beam, wherein the first access request includes the first beam-specific system information; and
receiving a second access request from a second UE of the plurality of UEs on a second beam, wherein the second access request includes the second beam-specific system information.

9. The method of claim 1, further comprising:
receiving a first access request from a first UE of the plurality of UEs on a first beam, wherein the first access request includes the first beam-specific system information; and
receiving a second access request from a second legacy UE of the plurality of UEs on the first beam, wherein the second access request includes legacy system information.

10. A wireless communication device, comprising:
a transceiver; and
a processor in communication with the transceiver, wherein the wireless communication device is configured to:

generate a system information block (SIB) comprising a structure that includes:
first system information associated with a plurality of SSB identifiers (IDs) and a first UE software type; and
second system information associated with a second UE software type, the second system information comprising a plurality of pairs including a first pair and a second pair, the first pair indicating a first SSB ID and first beam-specific system information associated with the first SSB ID, the second pair indicating a second SSB ID and second beam-specific system information associated with the second SSB ID, wherein each of the first beam-specific system information and the second beam-specific system information includes system information for establishing a connection with the wireless communication device that is specific to a beam in a plurality of beams transmitted by the wireless communication device; and
broadcast the SIB to a plurality of user equipments (UEs) in a serving cell.

11. The wireless communication device of claim 10, wherein the SIB includes an extension field that stores the structure.

12. The wireless communication device of claim 10, wherein at least one of the first beam-specific system information or the second beam-specific system information includes access control information.

13. The wireless communication device of claim 12, wherein the access control information includes an indicator that indicates whether the wireless communication device is accessible to a UE of the plurality of UEs.

14. The wireless communication device of claim 12, wherein the access control information includes information for accessing the wireless communication device.

15. A non-transitory computer-readable medium storing a set of instructions comprising one or more instructions that, when executed by one or more processors of a wireless communication device, cause the wireless communication device to:
generate a system information block (SIB) comprising a structure that includes:
first system information associated with a plurality of SSB identifiers (IDs) and a first UE software type; and
second system information associated with a second UE software type, the second system information comprising a plurality of pairs including a first pair and a second pair, the first pair indicating a first SSB ID and first beam-specific system information associated with the first SSB ID, the second pair indicating a second SSB ID and second beam-specific system information associated with the second SSB ID, wherein each of the first beam-specific system information and the second beam-specific system information includes system information for establishing a connection with the wireless communication device that is specific to a beam in a plurality of beams transmitted by the wireless communication device; and broadcast the SIB to a plurality of user equipments (UEs) in a serving cell.

16. The non-transitory computer-readable medium of claim 15, wherein the SIB includes an extension field that stores the structure.

17. The non-transitory computer-readable medium of claim 15, wherein at least one of the first beam-specific system information or the second beam-specific system information includes access control information.

18. The non-transitory computer-readable medium of claim 17, wherein the non-transitory computer-readable medium is associated with a wireless communication device, and wherein the access control information includes an indicator that indicates whether the wireless communication device is accessible to a UE.

19. The non-transitory computer-readable medium of claim 17, wherein the non-transitory computer-readable medium is associated with a wireless communication device, and wherein the access control information includes information for accessing the wireless communication device.

* * * * *